Figure 1:
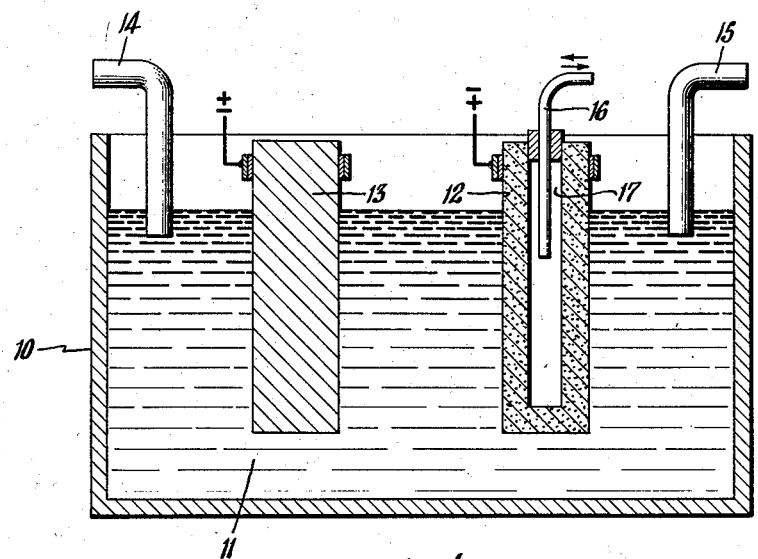

Feb. 17, 1942.   G. W. HEISE ET AL   2,273,798
ELECTROLYTIC PROCESS
Filed Oct. 31, 1939

INVENTORS
GEORGE W. HEISE
ERWIN A. SCHUMACHER
BY
ATTORNEY

Patented Feb. 17, 1942

2,273,798

UNITED STATES PATENT OFFICE 2,273,798

ELECTROLYTIC PROCESS

George W. Heise, Rocky River, and Erwin A. Schumacher, Parma, Ohio, assignors to National Carbon Company, Inc., a corporation of New York Application October 31, 1939, Serial No. 302,112

10 Claims. (Cl. 204—82)

The invention relates to electrolytic processes wherein an impressed electric current is passed through a cell having electrodes immersed in an aqueous electrolyte.

This application is in part a continuation of our applications Serial Numbers 118,472, 118,473, and 118,474, all filed on December 31, 1936; and 246,276 and 246,277, both filed December 17, 1938.

In its broad aspect, the invention comprises the use of porous electrodes to achieve one or more of the following objects:

(a) To decrease the voltage drop through, and the power consumption of, the cell;

(b) To provide for the introduction of one or more chemical reactants into the cell;

(c) To provide a situs for desired chemical reactions;

(d) To provide for the removal of one or more products from the cell, in some instances in relatively concentrated form, and (e) To increase the useful life of the electrodes.

The heart of the invention lies in the provision of an electrode having an effective surface area in contact with the electrolyte many times greater than the apparent or superficial area of contact, the body of the electrode being permeable either to gases alone or to both gases and liquids. Such an electrode consists, for example, of a porous or foraminous body of conductive material, preferably carbon, the dimensions of the pores and inner passages being extremely minute, as further described below.

We are aware that it has been heretofore proposed to use carbon electrodes possessing some permeability to fluids, in various electrolytic processes in an attempt to achieve one or more of the above objects; but none of these proposals has been capable of satisfactory practical application. We have found that many of the difficulties experienced by prior workers may be overcome by the use of an improved electrode material. Specifically, we have found that the electrode material should have a porosity above 35% (preferably between 40% and 70%), calculated as follows: % porosity=100 (real density— apparent density)÷real density. Further, the electrode material should have an air permeability above 15, and preferably above 30. Whenever used herein and in the appended claims, the term "air permeability" means the number of cubic inches of air per minute passing through one square inch cross-section of electrode material, when air at a pressure of one pound per square inch is blown through a block of the material one inch thick. The following table shows, for purposes of comparison, the porosity and permeability of ordinary electrode carbons (types 1, 2, and 3) and of the special electrode carbons included in this invention (types 4, 5, 6, and 7).

| Type | Porosity | Air permeability |
|---|---|---|
| | Percent | |
| 1 | 25 | 2 |
| 2 | 28 | 7 |
| 3 | 33 | 2 |
| 4 | 60 | 20 |
| 5 | 57 | 30 |
| 6 | 40 | 120 |
| 7 | 42 | 600 |

We have also found that the pores of the electrode material should be relatively minute and uniformly distributed, and not large, scattered voids and fissures. Material having the latter kind of pores might be described as "leaky" rather than "porous." The relative uniformity of distribution of the pores in the two kinds of materials may be distinguished by a simple test: if air is forced through a thin block of the material under water, at about the minimum air pressure required to obtain bubbles in the water, the "porous" material gives forth a cloud of small bubbles over its entire surface, while the "leaky" material gives a number of separate streams of bubbles issuing from the larger fissures and voids.

Another test for uniformity of porosity of these materials comprises determining the flow of a viscous liquid, such as a concentrated aqueous solution of cane sugar, under a moderate pressure, for instance a head of about six inches, through a thin (e. g. one-eighth inch) section of the material. Any relatively large fissures permit flow of the solution and are thereby made evident.

Porous electrode material within this invention may be made from comminuted solid carbonaceous material (for example, coke, graphite, or charcoal) and a porous carbonaceous binder (for instance, baked tar or pitch). Suitable methods for making such electrode material are described in U. S. Patent 1,988,478, issued on January 22, 1935, to B. E. Broadwell and L. C. Werking.

In some processes the kind of solid carbon chosen for the electrode material will make little or no difference; in other processes it will be desirable or necessary to take advantage of the fact that graphite has a higher oxygen overvoltage than coke, and that coke has a higher oxygen overvoltage than charcoal. Otherwise stated, in a given instance either a high or a low overvoltage may be influential, and the overvoltage characteristics may be accordingly controlled by a proper choice of electrode material.

Figure 2:
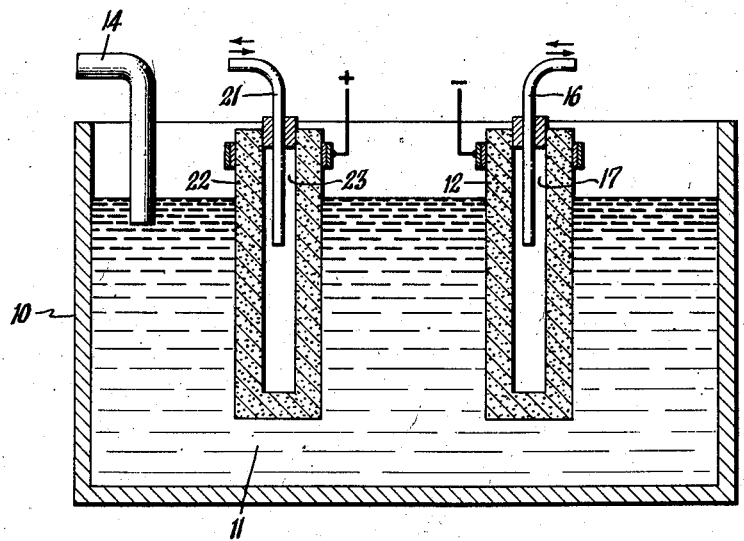

The practical application of the above-described new electrode material to electrolytic processes, according to this invention, will be described in connection with the attached drawing, in which Fig. 1 represents diagrammatically in vertical cross-section an electrolytic cell container 10 containing an electrolyte 11 in which are immersed a porous electrode 12 and a nonporous electrode 13, and Fig. 2 represents diagrammatically in vertical cross-section an electrolytic cell similar to that shown in Fig. 1 except that it contains two porous electrodes 12 and 22.

The device illustrated in Figure 1 may be used in cases where it is desired to introduce one or more reactants into the cell, or to remove one or more reaction products from the cell, through only one electrode.

The invention will be more particularly described herein in connection with certain methods for treating aqueous solutions of salts of multivalent metals, such as copper and iron. Such salts in a lower valence state may be oxidized at a porous carbonaceous anode, and anolyte containing the oxidized material withdrawn through the anode. Or the oxidized salt may be reduced at the cathode, either to metal which is deposited or to a salt in a lower valence state which may be removed with the catholyte, or alternatively a cathodic depolarizer, such as oxygen or air, may be passed through a porous carbon cathode to reoxidize the normal cathode product or to reduce the power requirement of the cell.

For example, the following processes are within the invention.

Example I

Various attempts have been made in the past to recover copper from reduced ores by leaching with cupric chloride and subsequently electrolyzing the leach liquor. In the so-called Hoepfner process, ore leaching proceeds as follows:

$$Cu_2S + 2CuCl_2 = 4CuCl + S$$

Sodium chloride is added to the solution to keep the cuprous chloride in solution. Upon electrolysis, part of the copper is deposited at the cathode and part is oxidized at the anode to regenerate the leach liquor:

$$4CuCl \rightarrow 2Cu + 2CuCl_2$$

Deposition of the copper from a cuprous salt requires one-half the energy required to deposit it from a cupric salt. Moreover, the cuprous chloride acts as an anodic depolarizer, thereby reducing the required cell voltage. However, heretofore, difficulties with diaphragms and low current efficiencies have hindered the commercial development of the process.

We have discovered by experiment that the porous carbon electrode of this invention may be utilized to overcome the above-described difficulties. Referring to Figure 1, the copper-rich leach liquor 11, containing cuprous chloride and sodium chloride, may be introduced into a cell 10 through a conduit 14; copper may be deposited at a solid cathode 13; and anolyte containing the cupric chloride formed during the depolarization reaction may be withdrawn through a porous carbon anode 12 and a suitable conduit 16. A voltage drop through the cell as low as 0.6 volt, and a current efficiency better than 90%, may be obtained.

Example II

Iron ores of several varieties including pyrrhotite, pyrites, and chalcopyrite, or metallic iron, for instance steel in process of fabrication or as scrap, may be leached with aqueous solutions of ferric chloride containing, for instance, in the neighborhood of 10 per cent ferric iron. The leaching operation produces ferrous chloride by reactions similar to:

$$2FeCl_3 + Fe \rightarrow 3FeCl_2$$
$$2FeCl_3 + FeS_2 \rightarrow 3FeCl + 2S$$

Upon electrolysis of the leach liquor containing ferrous chloride, ferric chloride may be regenerated. If the ferric salt accumulates, however, it soon diffuses and lowers cell efficiency. Diaphragms can be used to decrease the rate of diffusion, but such diaphragms are difficult to maintain.

In accordance with this invention, the acidity of the electrolyte is maintained high enough to prevent the formation of insoluble compounds of iron at electrolyte temperatures of about 70° C. to 100° C. Preferably the pH of the solution should not rise substantially above 1 as measured at room temperature. Anolyte containing the ferric chloride is withdrawn through a porous carbonaceous anode, preferably at a rate of flow about 20 per cent or 30 per cent greater than the theoretical; but considerably lower rates may be used.

Not only chlorides, but also other salts may be treated in an analogous manner. For instance, solutions containing ferrous sulfate, with or without ferric sulfate, may be electrolyzed to oxidize the ferrous to ferric sulfate and the product may be removed with anolyte through a porous carbonaceous anode; appropriate modifications being made in concentration of materials in, and the pH of, the electrolyte.

It has been observed that the addition of a small proportion, say 1 per cent to 4 per cent, of sodium chloride improves the current efficiencies of the processes employing iron sulfate solutions.

Example III

Copper may be dissolved from certain oxydic and sulfide ores, or dead roasted sulfide ores, by means of an aqueous leaching agent containing sulfuric acid and ferric sulfate. The reactions involved may be considered to follow equations of the following type:

$$CuS + Fe_2(SO_4)_3 = CuSO_4 + 2FeSO_4 + 2S$$
$$CuO + H_2SO_4 = CuSO_4 + H_2O$$

The resulting solution may then be electrolyzed to deposit copper at a cathode and to reoxidize the iron salt at an anode. The anodic oxidation of the iron to ferric sulfate depolarizes the anode and regenerates leach liquor.

In the above process, the depolarization products, ferric sulfate, will attack the copper already deposited and thereby reduce the energy efficiency of the process, unless means is provided to prevent transfer of the ferric salt to the catholyte. Heretofore, diaphragms have been used to some extent to prevent this transfer of the ferric salt; but diaphragms are relatively expensive and rather inefficient, they introduce an additional electrical resistance into the circuit, and they make it difficult to reoxidize all of the ferrous sulfate to permit its reuse for leaching. As a consequence, diaphragm processes have fallen into disfavor.

In the practice of this invention, copper-rich leach liquor containing cupric sulfate and ferrous sulfate may be introduced as the electrolyte 11 into the cell 10 through the conduit 14. An electric current is passed through the electrolyte 11 between the anode 12 and the cathode 13, whereby copper is deposited at the cathode 13 and ferrous sulfate is oxidized at the anode 12, the anodic oxidation of the iron salt serving to regenerate leach liquor and to depolarize the anode 12. Anolyte containing the ferric sulfate may then be withdrawn through the porous anode 12 and the conduit 16, thereby effectively preventing the ferric salt from diffusing to the cathode 13.

Experiments which we have made demonstrate the advantages of the invention. For example, a solution containing, for each 1000 cc. of water, 23 grams of copper as $CuSO_4$, 15 grams of iron as ferrous sulfate, and 30 grams of $H_2SO_4$, was electrolyzed as described above. Current densities of 15 to 35 amperes per square foot of anode were used. Anolyte was withdrawn through the porous carbon anode at rates equal to or slightly above those theoretically required to remove all of the ferric iron formed by anodic oxidation. Substantially complete removal of the ferric iron was obtained at all such rates of withdrawal of anolyte, from 90% to 98% removal being attained. Cell potentials at approximately the theoretical rate of flow of solution varied between 0.9 volt at a current density of 17 amperes per square foot and 1.35 volts at a current density of 34 amperes per square foot. In other experiments, it was determined that even lower cell potentials may be attained by using a solution containing somewhat more ferrous iron than that used in the above example. Using a solution containing 1000 cc. of water, 23 grams of copper as cupric sulfate, 30.5 grams of iron as ferrous sulfate, and 30 grams of $H_2SO_4$, the voltage drop through the cell was about 0.8 volt at a current density of 17 amperes per square foot and about 1.2 volts at a current density of 34 amperes per square foot.

The above cell potentials, or voltage drops, may be compared with the values, 1.9 to 2.5 volts obtained with lead anodes or with insoluble copper-silicon alloy anodes, under standard operating conditions where a depolarizer such as ferrous sulfate is not used.

Efficient depolarization of the anode is obtained, and disintegration of the carbon by anodic attack is substantially eliminated. The withdrawal of ferric sulfate as fast as it is formed assures continuous replenishment of ferrous ions at the electrochemically active interface and thereby improves depolarization.

As compared with prior processes for electrowinning copper in which no depolarizer is used, the present invention offers the advantage of low power consumption per pound of copper produced. The invention has advantages over prior processes employing iron as a depolarizer in that energy efficiency is increased and power consumption thereby reduced. Further, the invention permits the economical use of carbon anodes by preventing their rapid disintegration by anodic attack.

The fact that ferric iron is withdrawn as fast as it is formed also makes it possible to use solutions containing a higher concentration of ferrous iron than could heretofore be tolerated, and this fact, in turn, makes possible the economical extraction of many types of ores which require the use of leach liquor containing a higher concentration of iron than could be electrolyzed efficiently by previously known methods.

*Example IV*

The extraction of zinc from its basic ores, such as smithsonite and calamine, may be accomplished by a simple leach with dilute sulfuric acid, yielding a zinc sulfate solution which may then be electrolyzed to deposit the zinc. Current practice calls for the use of aluminum cathodes and lead or lead-alloy anodes. The voltage drop per cell is about 3.3 to 3.7 volts, and a current efficiency of about 90% is attained. Sometimes a nearly neutral solution is used for electrolysis, in which case a current density of about 30 or 40 amperes per square foot is used; sometimes a strongly acid electrolyte is treated, and in such a case the current density may be as high as about 100 amperes per square foot.

When a large part or all of the zinc is a sulfide (sphalerite), which may contain iron sulfide, a preliminary roasting is required to convert the insoluble zinc sulfide into acid soluble zinc oxide and water soluble zinc sulfate, and to oxidize any iron which may be present to an insoluble iron oxide. The disposal of the sulfur dioxide produced in this operation is frequently a difficult problem. Moreover, the roasting operation is difficult and requires careful control to prevent the formation of insoluble zinc compounds. The roasted ore is leached in much the same manner as the basic ores.

The above-described electrowinning processes have been used successfully to produce from 10% to 30% of the total amount of zinc made in the United States during the past ten years. Since leaching and electrowinning are particularly well suited to the working of low grade ores, it is reasonable to expect that electrowinning processes will become even more important as the reserves of high grade ore diminish. Accordingly, improvements in methods of leaching zinc ores and electrowinning zinc are of considerable technical and economic importance.

When treating zinc ores according to the invention, zinc sulfide ore is first leached with an aqueous solution of ferric salt, such as ferric chloride or sulfate, to yield a solution containing zinc salt and ferrous salt, by the following type of reaction:

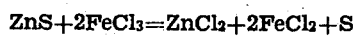

$$ZnS + 2FeCl_3 = ZnCl_2 + 2FeCl_2 + S$$

If the ore contains unreduced zinc, for example ZnO, it is advantageous to add to the leach liquor a chloride of an alkali or alkaline earth metal, such as the chloride of sodium, calcium, or magnesium. The use of a ferric chloride leach eliminates the roasting operation required when sulfuric acid is used.

The solution 11 obtained by leaching, after suitable purification, is introduced into the electrolytic cell 10; an electric current is passed between the anode 12 and the cathode 13, whereby zinc is deposited at the cathode and ferrous chloride is oxidized to ferric chloride at the anode, regenerating leach liquor and depolarizing the anode; and anolyte containing the ferric chloride is withdrawn through the porous carbon anode at a rate at least sufficient to effect substantially complete depolarization, and preferably at a rate exceeding this by about 10% or 15%, thus preventing transfer of ferric chloride to the cathode where it would attack the deposited zinc and thereby reduce the current efficiency. The reactions involved may be represented:

(a) $ZnCl_2 + electricity \rightarrow Zn(cathode) + Cl_2(anode)$
(b) $Cl_2 + 2FeCl_2 \rightarrow 2FeCl_3$ The depolarizing action of the ferrous chloride, the effectiveness of which is enhanced by the use of the special porous carbon anode described, results in a lowering of the voltage drop through the cell ("cell potential") to about 2 to 2.5 volts for continuous operation, depending upon the electrolyte composition and other factors. This may be compared with a cell potential of about 3.5 volts in the prior processes mentioned above.

The zinc output is about one pound per kilowatt hour, as compared with about two-thirds of a pound per kilowatt hour obtained in the prior processes. The current density may range from about 15 to about 40 amperes per square foot, and current efficiencies of about 90% are attained.

We have found that the use of an acid electrolyte, low temperatures, and low current densities, favor the deposition of zinc low in iron from a solution containing both metals. Greater latitude in operating conditions, and improved current efficiency, result from the addition to the electrolyte of sodium sulfate or a chloride of an alkali or alkaline earth metal, such as sodium, calcium, or magnesium.

As is the case in other electrowinning processes, the production of a fine grained, dense, hard, and uniform zinc deposit is assisted by the addition of a colloid, glue for example, to the electrolyte.

The zinc concentration in the electrolyte will depend to a considerable extent, of course, on the conditions in the leaching operation. We have successfully operated our process on electrolytes containing from 109 grams to 150 grams of $ZnCl_2$, 40 grams of NaCl, 124 grams $FeCl_2.4H_2O$, 4.8 grams HCl, and 0.5 gram of glue, per liter of electrolyte. Zinc concentrations outside of the above range may be handled without unusual difficulty.

We have successfully varied the iron chloride concentration in the electrolyte from about 35 grams to about 85 grams of ferrous iron per liter, the electrolyte also containing in each liter: 52 to 65 grams of zinc, 100 to 120 grams of NaCl, 5 to 8.4 grams of HCl, and 0.2 to 0.5 gram of glue, without substantial effect on the cathodic efficiency. In general, if the zinc content of the electrolyte is low, the best plating conditions are obtained when the iron concentration is low; but more iron may be used when the zinc content is raised. It is advantageous to keep the concentrations of both zinc and iron as high as possible, because this condition permits the more complete removal of zinc from solution, and reduces the volume of electrolyte and leach liquor which must be circulated per pound of deposited zinc. We have also found experimentally that, at the current densities mentioned above, the free hydrochloric acid content of the electrolyte should ordinarily be maintained between 5 and 10 grams per liter for best results, although other concentrations are useful and within the invention.

The influence of sodium sulfate or chlorides of the alkali or alkaline earth metals upon current efficiency is quite marked. In general, for maximum cathode efficiency in a solution containing a relatively high iron concentration and a relatively low zinc concentration, a relatively high concentration of salt is advantageous; but when the iron concentration is low, a decrease in the concentration of salt does not greatly change the current efficiency. High concentrations of salt tend to produce a relatively high content of iron in the deposited zinc. Although concentrations of NaCl up to 120 grams per liter have been used successfully, concentrations below about 50 grams per liter will usually be sufficient. Calcium chloride, magnesium chloride, and sodium sulfate have been successfully substituted for sodium chloride. Glue and other colloids may be used in various concentrations, from 0.1 to 0.5 gram of glue per liter being a typical example.

*Example V*

The invention also includes other processes in which one or more products of electrolysis are withdrawn through one or both electrodes. Along the latter processes are those in which the anion of a salt, such as a manganate, which contains a metal capable of existing in more than one valence state, is oxidized at a porous anode so as to lower the negative valence of the anion and promptly withdrawn from the cell through the anode.

For example, referring to Fig. 1, a solution 11 of a manganate of an alkaline metal may be electrolyzed, the manganate oxidized to permanganate at a porous anode 12, and anolyte containing the permanganate withdrawn continuously through the anode 12. For the anode, graphitized porous carbonaceous material is preferably used. Continuous operation is possible, and diaphragms may be eliminated. Current densities at least as high as 200 amperes per square foot may be used, and both the current efficiency and the percentage conversion of manganate to permanganate may be maintained above 85%. Mechanical stirring of the manganate solution is not necessary. In a typical experimental run, a solution containing 31 grams of potassium manganate and 60 grams of potassium hydroxide per liter was continuously electrolyzed at 28° C., using a porous graphitized carbon anode, an anode current density of 14 amperes per square foot, and a cell operating voltage of 2.3. A percentage conversion of manganate to permanganate of about 85, and a current efficiency of about 90% were obtained.

*Example VI*

Other embodiments of our invention involve the use of a porous carbon anode and a porous carbon cathode, as illustrated in Figure 2. For instance, a sodium sulfate solution may be electrolyzed to produce sulfuric acid at the anode and sodium hydroxide at the cathode, according to the equation:

$$Na_2SO_4 + 2H_2O = 2NaOH + H_2SO_4$$

The sodium sulfate solution may be placed in a cell 10 through a suitable conduit 14; anolyte containing the sulfuric acid may be withdrawn through a porous carbon anode 22 and a conduit 21; and catholyte containing the caustic soda may be withdrawn through a porous carbon cathode 12; thereby eliminating the two diaphragms which would otherwise be required.

*Example VII*

Another example of processes of this type is the electrolytic oxidation of potassium ferrocyanide to potassium ferricyanide. Referring to Fig. 2, a ferrocyanide solution may be introduced through a conduit 14 into the cell 10; anolyte containing potassium ferricyanide may be withdrawn through a porous carbon anode 12 provided with a well 17 and a conduit 16; and catholyte containing potassium hydroxide and unoxidized ferrocyanide may be withdrawn through a porous carbon cathode 22 provided with a well 23 and a conduit 21. The overall reaction may be represented as:

$$2K_4Fe(CN)_6 + 2H_2O = 2K_3Fe(CN)_6 + 2KOH + H_2$$

The use of two porous electrodes not only eliminates the need for diaphragms, but also provides a continuous process. A further advantage is that the ferricyanide is obtained in a concentration greater than that of the ferrocyanide. We have found by experiment that an anodic oxidation efficiency of 80% or better is obtainable.

Other embodiments of the invention are contemplated by us. For instance, polarization at either or both of the electrodes, which increases the resistance and opposes the flow of electric current, may be diminished by passing a fluid, which may be either a liquid or a gas, through the porous electrode into the cell or by withdrawing electrolyte from the cell through the porous electrodes, thereby mechanically decreasing the said concentration of material next to the electrode. Furthermore, if air or oxygen is admitted through the porous carbon cathode into the cell, depolarization of the cathode will reduce the power consumption of the cell.

It will be observed that in a number of the processes given as examples herein the attack and disintegration of electrode material by the electrolyte, or products or by-products of electrolysis, is prevented or hindered either by rapid removal of the corrosive material from contact with the porous electrode, or by preventing the formation of such materials by a depolarization reaction, or by making the depolarizing substance act as the electrochemically active electrode. Therefore, it has been found that the porous carbon electrodes are characterized by a long service life, even in many processes wherein carbon and graphite electrodes have not been used successfully heretofore.

It will also be observed that, whenever a material is introduced into the cell through a porous electrode, the electrode serves as an efficient distributor of such material. An effect of the extended nature and chemical composition of the surface of these porous carbon electrodes which is often observed is to promote certain reactions, and one beneficial practical result is an increased efficiency of depolarization. Thus, in a given instance the porous carbon electrode may serve several functions simultaneously to achieve the general objects of the invention.

Although several specific processes have herein been described in detail, it will readily be understood that these descriptions are presented only by way of examples illustrating certain aspects of the invention, and that the invention is not limited to or by such examples. Furthermore, although one shape of electrode is shown in the attached drawing as an example, the invention is not limited to that or any other specific shape. For instance, under some circumstances it may be desired to provide non-porous portions in the electrode, or to adopt a special shape, in order to regulate the distribution of fluid flowing through the electrode, or for another reason. It may also be advantageous to place a porous electrode or electrodes, not provided with a central well 17 or 23, at the end or ends of the cell container 10 in such a manner that a space is left between the electrode and the container, which space may be used to serve the functions of the central well 17 or 23 described herein.

We claim:

1. Method of oxidizing a salt selected from the group consisting of ferrous salts and salts of manganese in a valence state less than 7, which comprises electrolyzing an aqueous solution of such salt in an electrolytic cell between a cathode and a porous anode, said anode being uniformly porous and composed of comminuted solid carbon in a uniformly porous carbon binder, the porosity of said anode being between 35% and 70% and the air permeability thereof being above 15, whereby said salt is oxidized at the anode to a lower negative valence state, and promptly withdrawing, from between the anode and cathode and out of the cell through the porous anode, anolyte containing the oxidized salt.

2. Process for depositing copper from an aqueous electrolyte containing cupric sulfate and ferrous iron ions which comprises passing said electrolyte into an electrolytic cell between a cathode and a uniformly porous anode consisting of comminuted solid carbon in a porous carbon binder and having a porosity between 35% and 70% and an air permeability above 15, such cell being provided with means for withdrawing anolyte through the anode; passing an electric current through the cathode, anode, and electrolyte, thereby depositing copper at the cathode and anodically oxidizing the said ferrous iron ions; and withdrawing, from between the anode and cathode and out of the cell through the porous anode, anolyte containing the depolarization product.

3. Process for depositing copper from an aqueous electrolyte containing cupric sulfate and ferrous sulfate which comprises passing said electrolyte into a cell between a cathode and a uniformly porous carbon anode having a porosity between 40% and 70% and an air permeability above 30 and consisting of solid carbon particles in a porous carbon binder, such cell being provided with means for withdrawing anolyte through the said anode; passing an electric current through the anode, cathode, and electrolyte, thereby depositing copper at the cathode and oxidizing ferrous sulfate to ferric sulfate at the anode; and withdrawing, from between the anode and cathode and out of the cell through the porous anode, anolyte containing the ferric sulfate.

4. In a continuous process for depositing copper electrolytically from an aqueous electrolyte containing cupric sulfate by the use of a cathode and a carbon anode, the method of decreasing the amount of electrical energy consumed per pound of copper deposited and of increasing the durability of the carbon anode which comprises introducing into the electrolyte ferrous sulfate which acts as an anodic depolarizer, constructing said anode of uniformly porous carbon having a porosity between 35% and 70% and an air permeability above 15 and consisting of solid carbon particles in a porous carbon binder, providing means for withdrawing anolyte through said anode, and withdrawing, from between said cathode and anode and out of the cell through said porous anode, anolyte containing the product of the anodic depolarizing reaction.

5. Process for extracting copper from its sulfidic ores and compounds which comprises treating said ore or compound with an aqueous solution containing ferric sulfate and sulfuric acid to form an electrolyte containing cupric sulfate and ferrous sulfate; introducing said electrolyte into an electrolytic cell between a cathode and a uniformly porous carbon hollow anode having a porosity between 35% and 70% and an air permeability above 15 and consisting of solid carbon particles in a porous carbon binder; passing an electric current through the anode, cathode, and electrolyte, thereby depositing copper at the cathode and oxiding ferrous sulfate to ferric sulfate at the anode; and withdrawing from between the said anode and cathode and out of the cell through the porous anode anolyte containing the ferric sulfate.

6. Process for depositing zinc from an aqueous electrolyte containing a zinc salt and a ferrous salt which comprises passing said electrolyte into a cell between a cathode and a uniformly porous anode consisting of comminuted solid carbon in a porous carbon binder and having a porosity between 35% and 70% and an air permeability above 15, such cell being provided with means for withdrawing anolyte through the anode; passing an electric current through the anode, cathode, and electrolyte, thereby depositing zinc at the cathode and oxidizing the ferrous salt at the anode; and withdrawing from between the said anode and cathode and out of the cell through the porous anode anolyte containing the ferric salt.

7. Process for depositing zinc from an aqueous electrolyte containing zinc chloride and ferrous chloride which comprises passing said electrolyte into a cell between a cathode, a uniformly porous carbon anode having a porosity between 35% and 70% and an air permeability above 15 and consisting of solid carbon particles in a porous carbon binder, such cell being provided with means for withdrawing anolyte through the anode; passing an electric current through the cathode, anode, and electrolyte, thereby depositing zinc at the cathode and oxidizing ferrous chloride to ferric chloride at the anode; and withdrawing from between the anode and cathode and out of the cell through the porous anode anolyte containing the ferric chloride.

8. In a process for depositing zinc electrolytically from an aqueous electrolyte containing zinc chloride by the use of a cathode and a carbon anode, the method of decreasing the amount of electrical energy consumed per pound of zinc deposited and of increasing the durability of the carbon anode which comprises adding to the electrolyte ferrous chloride, which acts as an anodic depolarizer, and a salt chosen from the group consisting of sodium sulfate and the chlorides of the alkali and alkaline earth metals; providing an anode of uniformly porous carbon having a porosity between 35% and 70% and an air permeability above 30, and means for withdrawing anolyte through said anode; and withdrawing from between the anode and cathode and out of the cell through the porous anode anolyte containing the product of the anodic depolarization reaction.

9. Process for extracting zinc from its sulfide ore which comprises treating the ore with an aqueous solution containing ferric chloride to form an electrolyte containing zinc chloride and ferrous chloride; introducing said electrolyte into an electrolytic cell containing a cathode, a uniformly porous carbon anode having a porosity between 40% and 70% and an air permeability above 30, and means for withdrawing anolyte through the anode; passing an electric current through the cathode, anode, and electrolyte, thereby depositing zinc at the cathode and oxidizing ferrous chloride to ferric chloride at the anode; and withdrawing from between the anode and cathode and out of the cell through the porous anode anolyte containing the ferric chloride.

10. A continuous process for oxidizing an alkali metal ferrocyanide which comprises electrolyzing an aqueous electrolyte containing said ferrocyanide in an electrolytic cell containing a uniformly porous anode and a uniformly porous cathode, both the cathode and the anode being of carbon and having a porosity between 35% and 70% and an air permeability above 30 and consisting of solid carbon particles in a porous carbon binder, and means for withdrawing electrolyte through said anode and cathode, whereby the anion of said salt is oxidized at the anode to ferricyanide and alkali metal hydroxide is formed at the cathode; promptly withdrawing from between the anode and cathode, and out of the cell through the porous anode, anolyte containing the ferricyanide; and promptly withdrawing from between the anode and cathode, and out of the cell through the porous cathode, catholyte containing the alkali metal hydroxide.

GEORGE W. HEISE.
ERWIN A. SCHUMACHER.